July 7, 1953

C. J. FOSTER 2,644,392

TOASTER

Filed June 6, 1949

INVENTOR.
Cyril J. Foster
BY Albert G. McCaleb
Att'y.

July 7, 1953  C. J. FOSTER  2,644,392
TOASTER
Filed June 6, 1949  5 Sheets-Sheet 2
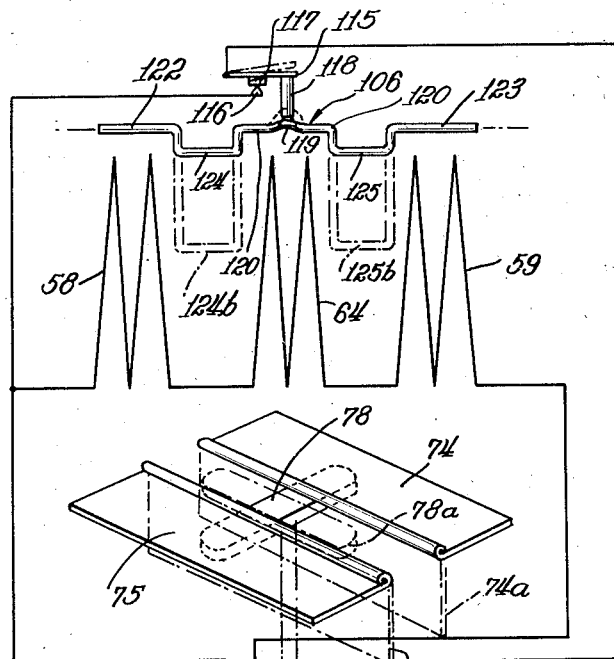
Fig. 3.
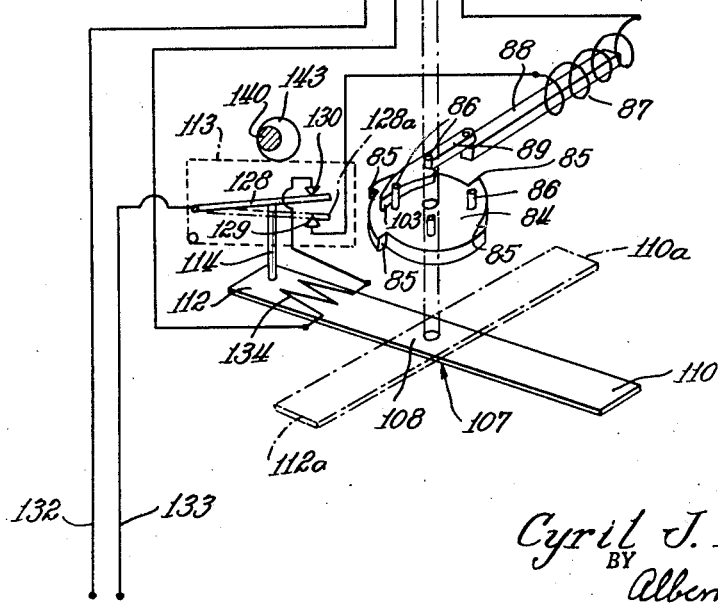
INVENTOR.
Cyril J. Foster
BY Albert G. McCaleb
Att'y.

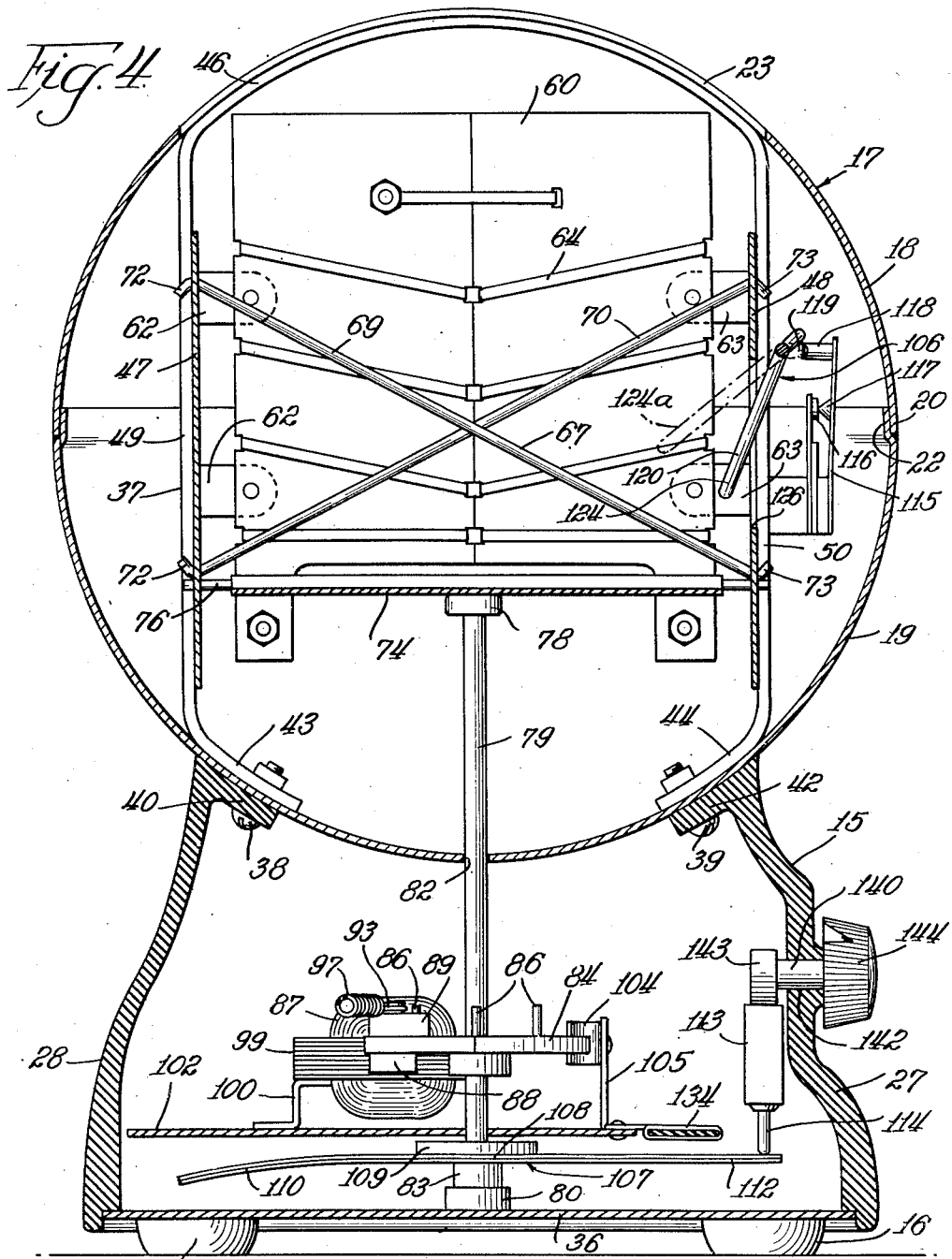

July 7, 1953  C. J. FOSTER  2,644,392
TOASTER
Filed June 6, 1949  5 Sheets-Sheet 4
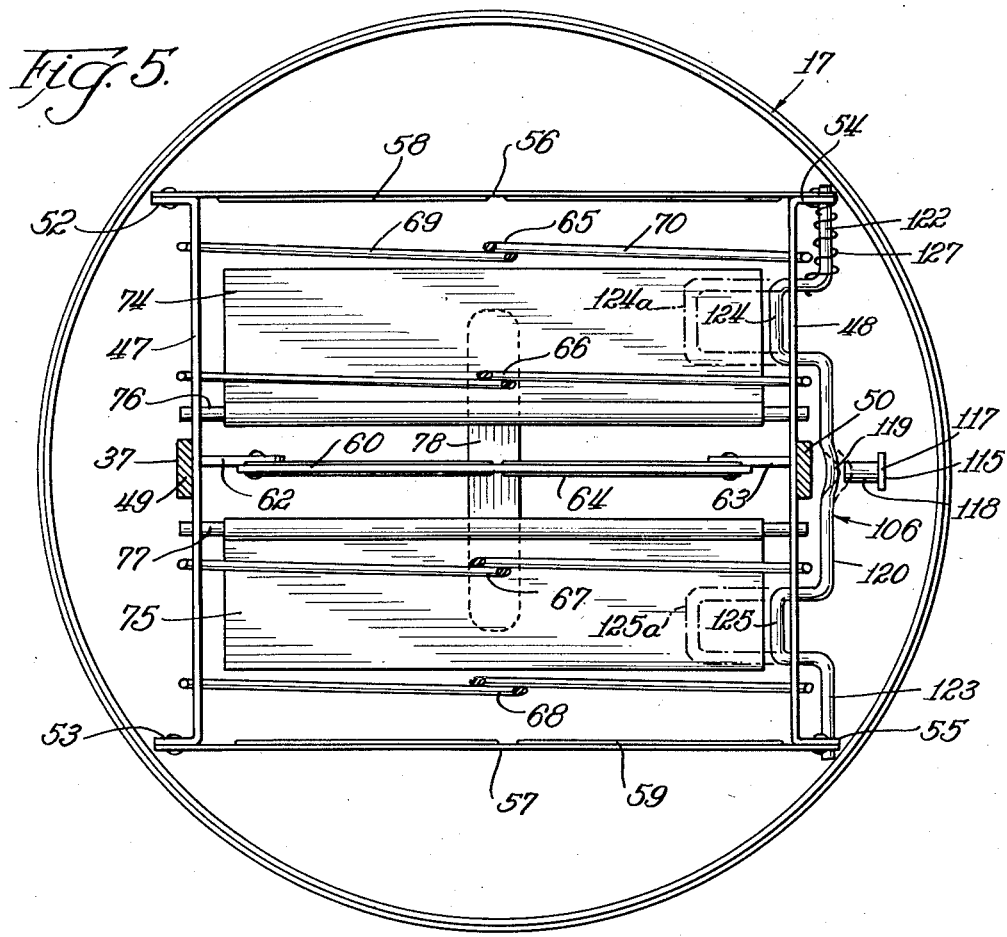
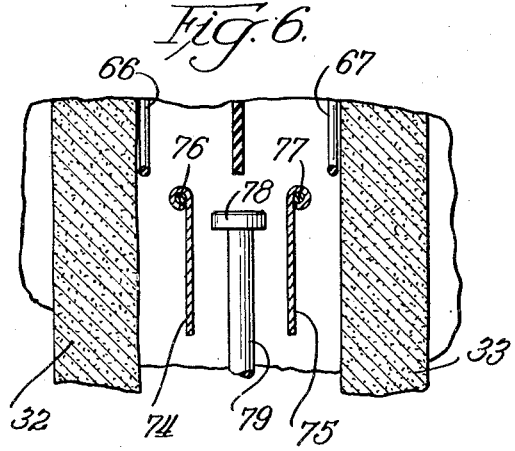
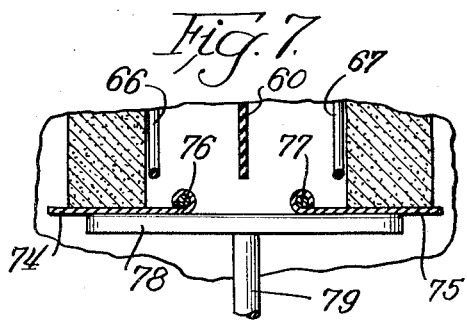
INVENTOR.
Cyril J. Foster
BY Albert G. McCaleb
Atty.

July 7, 1953   C. J. FOSTER   2,644,392
TOASTER
Filed June 6, 1949   5 Sheets-Sheet 5
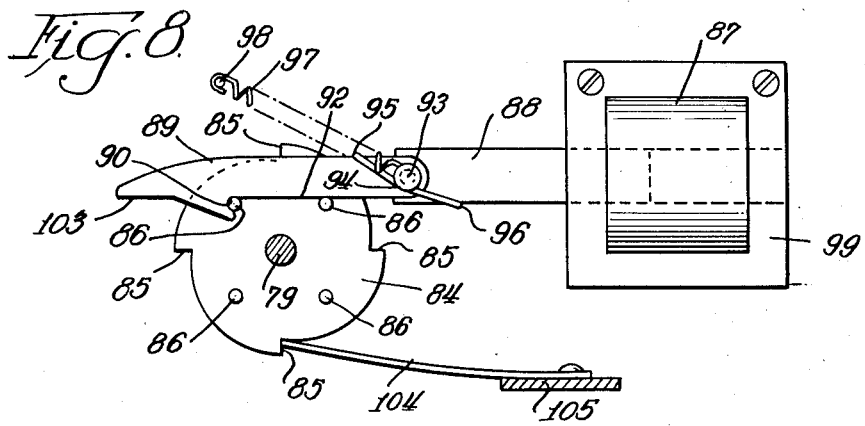
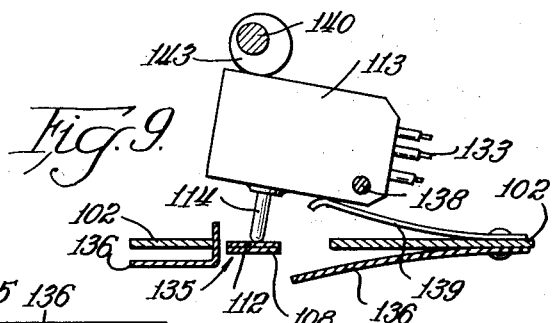
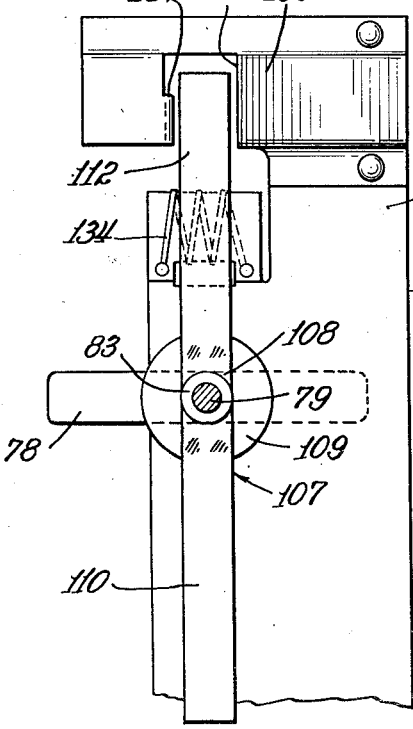
INVENTOR.
Cyril J. Foster
BY Albert G. McCaleb
Atty.

Patented July 7, 1953

2,644,392

UNITED STATES PATENT OFFICE 2,644,392

TOASTER

Cyril J. Foster, Chicago, Ill., assignor to Etc., Inc., Niles, Mich., a corporation of Michigan Application June 6, 1949, Serial No. 97,380

3 Claims. (Cl. 99—329)

This invention relates to toasters for bread and the like, and more particularly to toasters of the automatic type which embody apparatus for effecting control of the time of the toasting cycle.

One of the objects of my invention is to provide an electrically operated automatic toaster for sliced bread and which has parts for effecting the commencement of the toasting cycle upon the insertion of a slice of bread, the timing of which cycle is adjustable and automatic, and at the end of which cycle the heating element is deenergized and the toasted bread made available for use.

As another object, the invention has within its purview the provision of an automatic electrically operated toaster incorporating a toasting cycle timing mechanism which embodies temperature responsive elements separately operable for determining the toasting time and sequentially used in a manner such that the toaster may be used time after time with one temperature responsive element in use while another is returning to its normal state.

My invention further comprehends the provision of a toaster for sliced bread having a toasting compartment defined by a housing with curved heat reflecting walls adapted effectively and efficiently to concentrate the heat over the surface of a bread slice in a toasting position within the housing.

Another object of this invention is to provide an automatic toaster for bread slices and wherein the toasted slices are released at the end of the toasting period for movement by gravitational force away from the heated portion of the toaster.

It is a further object of the invention to provide an electrically operated automatic toaster which, after the preselection of a desired toasting time, requires only the manual insertion of bread slices to effect its operation.

Other objects and advantages of the invention will be apparent from the following description and the accompanying drawings in which similar characters of reference indicate similar parts throughout the several views.

Referring to the five sheets of drawings:

Fig. 3 is a diagrammatic exploded view indicating the general arrangement and relationships of parts of my preferred toaster, as well as the circuit connections of the electrical parts thereof;

Fig. 4 is a side sectional view of my toaster wherein the section is taken substantially on a line 4—4 of Fig. 1 and in the direction indicated by arrows;

Fig. 5 is a top plan view of a portion of the toaster structure wherein the top part of the housing is removed to show the internal parts;

Figs. 6 and 7 are fragmentary side sectional views of a portion of the toaster structure, and in which views different operating positions of certain of the parts are depicted;

Fig. 8 is a fragmentary top plan view illustrating my preferred structure for certain of the operating parts of the toaster;

Fig. 9 is a fragmentary elevational view showing parts of my toaster structure and their relationships, as viewed from within the enclosure for such parts, and Fig. 10 is a fragmentary bottom view depicting the construction and relationship of certain operating parts of my preferred toaster structure.

Having reference to the exemplary embodiment of my toaster which is shown in the accompanying drawings for illustrative purposes, the general ensemble includes a base 15 which is preferably made of a heat insulating material, such as a molded heat resistant plastic or phenol fiber, and which is supported by feet 16 and carries on its top a toaster housing 17, which is preferably a metal shell and encloses the heating elements by which the toasting is accomplished. My toaster, in the form illustrated, is not only adapted to automatic operation so that the toasting time cycle is automatic and the toast made readily available for use at the end of the time cycle, but it is also my preference to provide a toaster structure constructed and arranged in a manner such that the bread slices, or the like, pass through the toasting zone of the housing for release to an accessible position, rather than being retained completely or partially within the toasting zone a the end of the toasting cycle.

Figure 1:
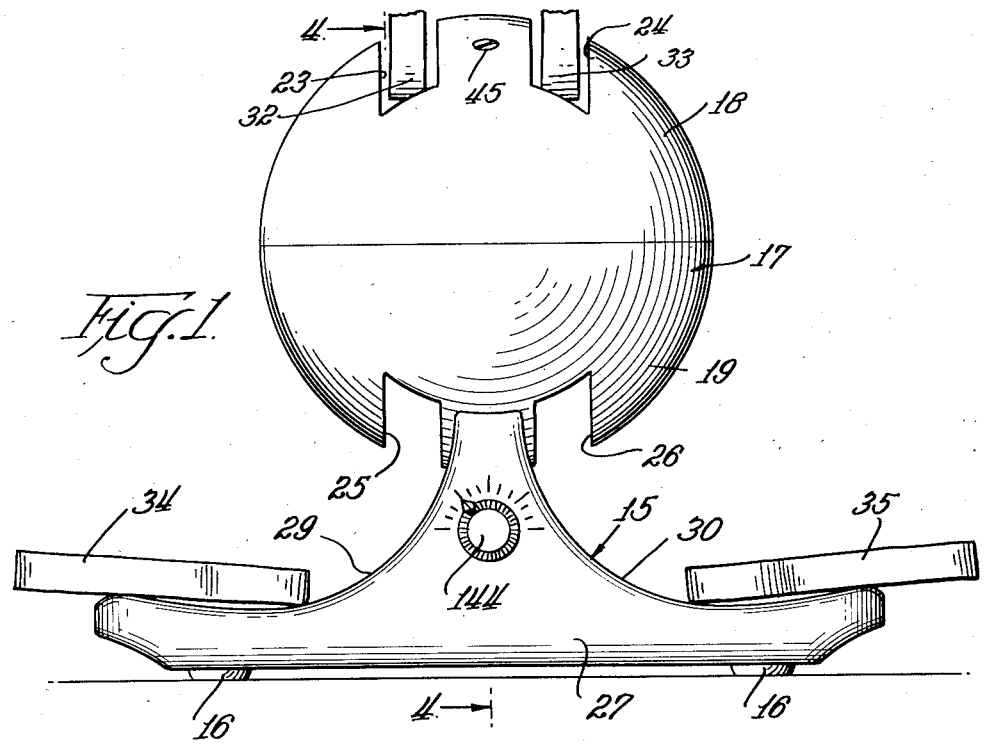
Figs. 1 and 2 are respectively front elevational and top plan views of a toaster embodying a preferred form of my invention, and each of which views shows the toasting positions of bread slices and the delivery positions of finished toast slices.
Figure 2:
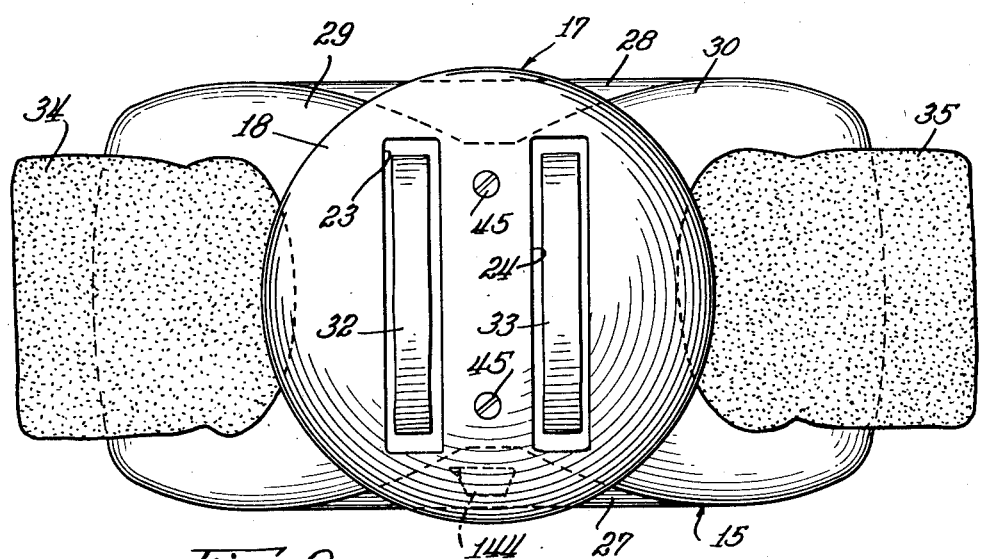

As depicted in Figs. 1, 2 and 4, my preferred housing 17 comprises a substantially spherical metal shell having upper and lower portions 18 and 19 respectively which are each substantially hemispherical and which, in their assembled relationship, have overlapping marginal portions 20 and 22, with the inner marginal portion 22 offset inwardly to effect the presentation of a relatively smooth external surface. Slot type openings 23 and 24 are provided in the housing portion 18 through which bread slices are inserted into the toaster for toasting. Directly below the openings 23 and 24, and in the lower portion 19 of the housing, additional slot type openings 25 and 26 are provided, through which latter openings the toasted bread slices pass from the toasting zone within the housing 17. Thus, the openings 23 and 25 provide one aligned pair of openings for the passage of a bread slice into and from the toaster housing, while the openings 24 and 26 provide another such aligned pair. The top openings 23 and 24 as well as the bottom openings 25 and 26 are spaced apart and have opposed edges lying in substantially parallel planes, which planes, in the present instance, are symmetrically disposed on opposite sides of a central plane through the housing.

In the preferred type of base, the front and rear walls 27 and 28 respectively extend upwardly, tapering to a relatively narrow top section at their mid-portion, so as to fit between the bottom openings 25 and 26. Also, opposed top wall portions 29 and 30 are similarly and oppositely curved outwardly as they extend downwardly from the relatively narrow top mid-portion of the base, thereby to form chutes extending downwardly and outwardly below the lower openings 25 and 26. The toaster housing 17 being secured to the top of the relatively narrow base mid-porton, slices of bread or the like, as 32 and 33, inserted into the toaster housing through openings 23 and 24 respectively, as depicted in Figs. 1 and 2, will be discharged, after toasting, through the lower openings 25 and 26, and will gravitate to positions such as those indicated by the toast slices 34 and 35 respectively. As a further consideration, the interior of the base 15 is hollow to provide an enclosure for some of the operating parts of the toaster at a position somewhat isolated from the heated toaster housing 17. As indicated in Fig. 4, the hollowed interior of the base 15 is preferably closed at the bottom by a base plate 36.

Referring in greater detail to the structure of the parts included within the toaster housing 17, as illustrated in Figs. 3, 4 and 5, I have provided a central and inverted substantially U-shaped frame 37, which frame serves to hold the housing portions 18 and 19 together, in addition to providing a main supporting frame. Fastening means, such as screws 38 and 39, extend through internal flanges 40 and 42 respectively which are integrally formed on the relatively narrow top mid-portion of the base 15 and through the lower portion 19 of the housing, as well as through formed end portions 43 and 44 on opposite sides of the frame 37. These screws thus secure the toaster housing 17 to the base 15 and secure the frame 37 within the lower portion 19 of the housing. Fastening means, such as screws 45 (Fig. 1), are utilized to secure the upper housing portion 18 to a curved mid-portion 46 of the main frame.

Substantially rectangular metal end plates 47 and 48 are secured in practically parallel and opposed relationship to straight side portions 49 and 50 of the frame 37. Flanges 52 and 53 at opposite sides of the end plate 47 and flanges 54 and 55 extending along opposite side edges of the end plate 48 have sheets of insulating material 56 and 57, such as mica sheets, secured thereto, so that they span the space between opposite sides of the end plates in practically parallel relationship. These insulating sheets carry strands of resistance wire in spaced relationship to provide heating elements 58 and 59 facing inwardly toward one another. The heating elements 58 and 59 have an area sufficient to toast the face of an ordinary slice of bread, and are disposed in planes lying outside of the toast receiving and outlet openings. In a plane lying between the spaced openings, a third insulating sheet 60, of mica or the like, is carried by inwardly projecting tabs 62 and 63 on the end plates 47 and 48 respectively. This insulating sheet carries a heating element 64 which is exposed on both faces of the insulating sheet and is adapted to heat the adjacent surfaces of two bread slices at the same time. For supporting the bread slices between and in spaced relationship laterally between the heating elements, I provide spaced pairs 65, 66, 67 and 68 of diagonally disposed wires 69 and 70; two pairs of such wires being mounted in spaced relationship between each of the outside heating elements and the intermediate heating element, with the spacing between adjacent pairs sufficient to receive a bread slice. These wires, in the disclosed toaster structure, each have end portions 72 and 73 extending through openings in the end plates 47 and 48, and bent to hold them in place.

For supporting the bread slices in the toasting zones between the heating elements during a toasting cycle, trap elements 74 and 75 are provided. These trap elements are hingedly supported for swinging movement between supporting and retracted positions by rods 76 and 77 respectively which each project through aligned bearing openings in the end plates 47 and 48. In the disclosed structure, the supporting rods 76 and 77 are in substantially parallel relationship at the mid-portion of the plates and below the respective heating elements, so that the trap elements swing outwardly in opposed directions to their retaining positions, as depicted in Figs. 4, 5 and 7, and as illustrated in solid lines in Fig. 3. In their retracted positions, the trap elements drop to positions in which they hang downwardly from the rods 76 and 77, as shown in Fig. 6, and as indicated in dot and dash lines at 74a and 75a, in Fig. 3. Actuation of the trap elements 74 and 75, to effect their retention in the retaining position, and to release them for movement to the retracted position, is effected by an arm 78 secured to an end of a rotatable operating shaft 79; the arm 78 being swingable about the axis of the shaft 79 in a plane immediately below the rods 76 and 77 which support the trap elements, so that when disposed in a position lateral to the rods, the trap elements are supported in their retaining positions, as shown in Figs. 4, 5 and 7. When the arm 78 is longitudinally disposed in substantially parallel relationship between the rods 76 and 77, as shown in dot and dash lines at 78a in Fig. 3, and as illustrated in Fig. 6, the trap elements gravitate to a dependent position relative to the rods, thereby to release retained toast slices for passage through the outlet openings 25 and 26 at the bottom of the toaster housing.

In the disclosed embodiment of my invention, the shaft 79 extends upwardly from a bearing collar 80 secured to the mid-portion of the base plate 36 (Fig. 4) and through a bearing bore 82 in the lower housing portion 19. A collar 83 secured to the lower end of the shaft rests against the surface of the bearing collar 80 to support the shaft. Also, in the disclosed structure, the shaft and the arm 78 are adapted to actuation in sequential 90 degree increments of movement.

My preferred actuating mechanism for effecting the sequential 90 degree increments of movements of the shaft 79, includes a ratchet wheel 84 drivingly secured to the shaft 79 within the hollow portion of the base 15 and having peripheral notches 85 spaced in 90 degree relationship relative to one another. Also, drive pins 86 are secured to and project axially from the face of the ratchet wheel in 90 degree spaced relationship relative to one another at circumferentially preselected positions relative to the positions of the notches 85. As shown in Figs. 3, 4 and 8, a solenoid 87 having a movable armature 88 drivingly connected to a pawl 89 disposed to engage the pins 86, is utilized to produce the sequential increments of shaft movement. The axis of linear movement of the solenoid armature 88 is disposed transversely and to one side of the axis of the shaft 78, so that a hook portion 90 on the pawl 89 normally engages one of the drive pins 86, while a straight side surface 92 of the pawl engages an adjacent one of the drive pins, as shown in Fig. 8. The pawl 89 is connected to the end of the armature 88 for limited swinging movement laterally of the armature axis by a pin 93. Also, a torsion spring 94 having end portions 95 and 96 engaging opposite sides of the pawl and armature respectively on opposite sides of the pin 93 axially of the armature, biases the pawl toward the drive pins relative to the armature. A tension spring 97 having one end connected to the pin 93 and its other end anchored to a stationary pin 98 biases the armature and its pawl to the normally extended positions illustrated in Fig. 8.

As depicted in Fig. 4, the solenoid 87 is preferably provided with a magnetic core 99 for the improvement of its magnetic efficiency. This core is supported relative to the ratchet wheel by a bracket 100 which is secured to an auxiliary base plate 102 above the base plate 36. Energization of the solenoid draws the armature 88 into the winding from the extended position depicted in Fig. 8. During such movement, the hook portion 90 of the pawl is engaged with one of the drive pins 86 and effects rotational movement of the ratchet wheel 84 and shaft 79 through 90 degrees, and until the succeeding one of the drive pins engages a projecting stop surface 103 on the end of the pawl 89, as illustrated in Fig. 3. In this manner, the ratchet wheel and shaft are stopped at the end of the 90 degree increment of movement. At this position, the free end of a leaf type retaining spring 104 engages one of the notches 85 in the periphery of the ratchet wheel to hold the ratchet wheel in the position into which it is actuated; the other end of the retaining spring 104 being secured to a support bracket 105 which extends upwardly from the auxiliary base plate 102, as shown in Fig. 4. From the actuated position illustrated in Fig. 3, the armature and pawl are again returned to the extended position, shown in Fig. 8, by the action of the tension spring 97, when the solenoid 87 is deenergized. It may be readily understood that the positions of the respective peripheral notches and drive pins on the ratchet wheel 84 are so related to the disposition of the arm 78 at the end of the shaft 79 and the axes of movement of the trap elements 74 and 75 that those trap elements are alternately actuated between their extended and retracted positions upon the sequential 90 degree movements of the shaft which are produced by successive operations of the solenoid driven pawl.

Having thus provided for the electrical actuation of the trap elements, to control the retention and release of toast slices, it is my further preference to provide controls for making the operation of the toaster as fully automatic as practical. For this purpose, I not only provide a switch mechanism 106 actuated by the insertion of one or two bread slices in the toasting zone to initiate operation of the toaster, but I also provide a timing mechanism 107 for effecting automatic timing of the toasting cycle; both of which latter mentioned mechanisms are adapted, through electric circuits, to effect operation of the solenoid to control the positions of the trap elements. Although there are various types of adjustable timing mechanisms which are suited to use for controlling the timing cycles of electrical toasters, such as that shown herein, it is my preference to utilize such a mechanism which is dependent upon the flexure of a bimetallic strip and to provide a structure and arrangement such that toasting cycles may follow in close sequence without the necessity of consciously waiting for a return of the bimetallic strip to normal after flexure.

As illustrated in Figs. 4 and 10, the disclosed timing mechanism includes an elongated bimetallic strip 108 secured to the lower end of the shaft 79 between the collar 83 and a disk 109, with its end portions 110 and 112 projecting equally in opposite directions and normally in substantially perpendicular relationship from the axis of the shaft 79. As illustrated in Figs. 3, 4 and 9, a single pole, double throw switch 113 is mounted for limited swinging movement on the interior of the front wall 27 of the base 15 with an actuating element 114 at a position for engagement with the end portions 110 and 112 of the bimetallic strip when those end portions are brought into alignment with that actuating element by rotation of the shaft 79 to preselected positions. Actually, the relative positions of the bimetallic strip and the switch 113 are determined in relationship to the sequential increments of movement of the shaft 79 which are determined by the solenoid and its accompanying ratchet mechanism, as well as in relation to the operating positions of the arm 78 and the trap elements actuated thereby. As shown in Fig. 3, in each instance, when the trap elements 74 and 75 are in their bread slice retaining positions, one of the end portions of the bimetallic strip is in a position of alignment with the switch actuating element 114 for effecting actuation of the switch 113. This arrangement provides intermediate positions of the end portions of the bimetallic strip, as shown in dot and dash lines at 110a and 112a in Fig. 3, which latter intermediate positions correspond to the positions of the arm 78 in which the trap elements are open or retracted. In the disclosed structure, the intermediate positions of the end portions of the bimetallic strip provide the normal positions of the parts which are assumed when the heating elements are not energized and the toaster is not in use; it being understood that when the toaster is in use, with a toasting cycle in progress, one of the end portions of the bimetallic strip is in its aligned position relative to the actuating element 114 of the switch 113.

The switch mechanism 106 which initiates the operation of the toaster upon the insertion of a bread slice into either of the toasting zones through one of the openings 23 or 24, includes a normally closed single pole, single throw switch 115. Having a relative stationary contact 116 and a movable contact 117, the latter of which contacts carries an actuating element 118 aligned for actuation by a cam portion 119 of a movable switch operating element 120. The latter mentioned switch operating element 120, in the disclosed structure, as well as the cam portion 119 thereof, comprises a wire or light rod formed to provide aligned end bearing portions 122 and 123 supported for rotational movement in bearings provided by the flanges 54 and 55 on the end plate 48. Intermediate the end portions, substantially U-shaped portions 124 and 125 extend through slots such as 126 in the end plate 48 in substantially coplanar relationship and are biased to positions such that they normally project into the path of a bread slice inserted into one of the openings 23 and 24. The biasing force which normally holds the switch operating element 120 in a position such that the U-shaped portions 124 and 125 thereof project into the toasting zones, and which holds the cam portion 119 of that element in a position such that it holds the normally closed contacts of the switch 115 in an open position, is provided by a torsion spring 127 encompassing the end portion 122 of the switch operating element and having one end engaging the flange 54 and its other end secured to the portion 124 of the switch operating element. The normal positions of the U-shaped portions 124 and 125 of the switch operating element are indicated in dot and dash lines at 124a and 125a in Figs. 4 and 5, while the positions to which those portions are moved by the insertion of a bread slice are shown in solid lines in Figs. 4 and 5 and in dot and dash lines at 124b and 125b in Fig. 3.

The switch 113 which is adapted to actuation by the end portions 110 and 112 of the bimetallic strip includes a movable switch element 128 alternately engageable with stationary contacts 129 and 130. When the toaster is in its normal, non-operating condition in which the bimetallic strip 108 has its end portions at positions indicated at 110a and 112a in Fig. 3, the movable switch element is at the position depicted in dot and dash lines at 128a, in Fig. 3, and is in engagement with the stationary contact 129. When the end portions 110 and 112 of the bimetallic strip are cool, and in their normal positions, they effect actuation of the movable switch element 128 to the position shown in solid lines in Fig. 3, in which a circuit is closed to the stationary contact 130; it being understood that flexure of the end portion of the bimetallic strip, as the result of heat applied thereto, causes the movable contact element 128 to disengage the contact 130 and reengage the contact 128.

With these details of the normal switch positions and operations in mind, the operating sequences and my disclosed circuit arrangement may be understood by reference to Fig. 3. Leads 132 and 133 represent wires, such as a conventional attachment cord, by which the toaster is connected to a suitable power supply line. Starting with the assumption that the toaster is at its normal and non-operating position, with the end portions of the bimetallic strip at their intermediate positions, designated by 110a and 112a, and with the trap elements open, as depicted at 74a and 75a, the heating elements 58, 59 and 64 deenergized, and the switch operating element 120 in a position such that the portions 124 and 125 thereof extend into the toasting zone as depicted at 124b and 125b, the sequence of toast operations is as follows: The attachment of the leads 132 and 133 to a power source prior to the insertion of bread slices produces no result, because the circuit to the solenoid 87 is broken by the separation of the contacts 116 and 117 of the switch 115 and the circuit to the heating elements is broken by the normal separation of the contacts 128 and 130 of the switch 113. When, however, a bread slice is placed in the toasting zone, so that it moves the switch operating element 120, the contacts 116 and 117 of the switch 115 are closed to complete a circuit to the solenoid 87 through the contacts 128 and 129 of the switch 113 and the contacts of the switch 115. The resultant operation of the solenoid produces an increment of movement of the shaft 79 to close the trap elements 74 and 75, thereby to retain the bread slice, and moves the bimetallic strip to a position such that one end portion thereof actuates the switch 113 to break the circuit to the solenoid through the contacts 128 and 129 and to close a circuit from the power supply line leads to the heating elements through the contacts 128 and 130 of the switch 113.

The circuit to the heating elements 58, 59 and 64 includes a resistance heating element 134 in series therewith, which latter heating element is in closely spaced relationship to the end portion of the bimetallic strip when it is in engagement with the actuating element 114 of the switch 113. The toasting cycle is thus started with either one or two bread slices retained between the heating elements by the closed trap elements 74 and 75. With the completion of the circuit to the toaster heating elements 58, 59 and 64 through the heating element 134, the latter heating element gradually heats the end portion of the bimetallic strip to time the toasting cycle in proportion to the current flow through the heating elements. The resultant flexure of the operative end portion of the bimetallic strip effects the return of the movable switch element 128 of the switch 113 to its normal position of engagement with the contact 129 after the disengagement thereof from the contact 130. Disengagement of the contacts 128 and 130, of course, opens the circuit to the heating elements, thereby effecting their deenergization. Residual heat effects complete operation of the switch 113 to an extent that a circuit is again closed to the solenoid 87 through the contacts 128 and 129 and the contacts 116 and 117 of the switch 115, which contacts are closed prior to the release of the toasted bread slices from the toasting zone. The resultant second operation of the solenoid armature produces a second increment of movement of the shaft 79 to return the bimetallic strip to its normal intermediate position and to release the trap elements 74 and 75 for the passage of the toasted bread slices from the toaster. The departure of the toasted bread slices from the toasting zone effects a release of the switch operating element 120, so that it again opens the contacts 116 and 117 of the switch 115, whereupon the cycle may be repeated.

It may be observed from the structure and operation as thus far described, that the end portions 110 and 112 of the bimetallic strip alternately come into operative relationship with the actuating element 114 of the switch 113. This alternating and sequential operation of the two end portions of the bimetallic strip provides a normal cooling time for the unused end portion of the strip while the other is being used, and thereby avoids the necessity of waiting between toasting cycles for a single bimetallic element to cool. In Figs. 9 and 10, I have illustrated certain additional structural details by which the proper and effective operations of the bimetallic strip are insured and the toasting time cycle may be varied by manual adjustment. As there depicted, it is my preference that the auxiliary base plate 102 shall have an opening 135 through which the actuating element 114 of the switch 113 is accessible to the end portions of the bimetallic strip. On the face of that auxiliary base plate over which the end portions of the bimetallic strip move into operative engagement with the switch actuating element 114, I prefer to provide a plate 136, the surface of which is curved so as to utilize the resilience of the bimetallic strip for flexing the end of the bimetallic strip away from the switch actuating element 114 immediately prior to its engagement with that actuating element, whereby to bring the bimetallic strip into contact with the switch actuating element with a sharp snap. Also, on the side of the opening 135 opposite the curved plate 136, I prefer to provide a flange 137 which faces the opening so as to provide a definite stop for the bimetallic strip and also so as to necessitate a predetermined amount of flexure of the used end portion of the bimetallic strip prior to its release of the switch actuating element and its movement away from the operating position.

As illustrated in Fig. 9, the switch 113 is supported for limited swinging movement relative to the base 15 of the toaster by means, such as a screw 138. A leaf spring 139 having one end secured to the auxiliary base plate 102 has its other end engaging the side of the housing of the switch 113, so as to bias the switch in a direction relative to the screw 138, such that it tends to move the actuating element 114 away from the position of contact with the end portion of the bimetallic strip. A shaft 140 (Figs. 4 and 9) is mounted for rotation in a bearing bore 142 in the front wall 27 of the base 15, and carries an eccentric cam 143 on the side of the switch 113 opposite the spring 139. This cam is manually adjustable to determine the position of the switch 113 relative to the end portion of the bimetallic strip, whereby to effect a selection of the bimetal flexure necessary for producing operation of the switch, thus to vary the time of the toasting cycle. A knob 144 on the shaft 140 exterior to the base 15 provides a convenient manually operable element for adjusting the toasting time.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an automatic toaster operable when connected to an electrical power source for toasting bread slices and the like, the combination comprising a housing having openings therein for the insertion of a bread slice and for the passage of a toasted slice from the housing, heating elements within the housing for toasting both sides of a bread slice when inserted through one of said openings, a trap element mounted within the housing for retaining a bread slice therein while toasting and movable to release the toasted bread slice for passage from the housing by gravity through the other of said openings, a switch actuating element mounted within the housing and having a normal position from which it is moved by the insertion of a bread slice, and an electrically operated control and actuating mechanism for effecting actuation of the trap element and for controlling the toasting time, said control and actuating mechanism including a first switch having normally open contacts and responsive to movement of said switch actuating element from its normal position for effecting closure of the contacts, a second switch of the single pole double throw type normally biased to a position such that it has normally open and normally closed contacts, a solenoid having a winding connected to the power source through the contacts of the first switch and the normally closed contacts of the second switch, a movable member operated by said solenoid and having parts for effecting actuation of the trap element and for actuating the second switch to open the normally closed contacts and close the normally open contacts thereof, and a timing element controlled by the normally open contacts of the second switch for effecting return of the contacts of the second switch to their normal positions, and said normally open contacts of the second switch being connected to provide a circuit from the power source to the heating elements.

2. In an automatic toaster for bread slices and the like, the combination comprising a trap element supported for movements between an extended slice supporting position and a retracted position, a shaft supported for rotation at one side of the trap element, said shaft having a trap element engaging part thereon and driven thereby, said trap element engaging part having spaced projections thereon so as alternately to engage and disengage the trap element upon movements thereof through successive increments of preselected angular extent to effect movements of the trap element alternately to said slice supporting and retracted positions, a shaft driving mechanism including a solenoid actuated ratchet for turning the shaft step by step through angular increments of said preselected angular extent, bimetallic means secured to the shaft in fixed angular relationship to the trap element engaging part and having parts corresponding in space and position to the spaced projections on the trap element engaging part, a switch mounted at one side of the shaft in alignment for operating engagement with the parts of the bimetallic means when the trap element is in the slice supporting position, and said switch being electrically connected to the solenoid to effect operation thereof in response to action of the bimetallic means.

3. In automatic heating apparatus for articles, the combination comprising a switch closed in response to presence of an article in the apparatus and open in the absence of an article from the apparatus, a retainer for the article in the apparatus shifting between retaining and releasing positions, a heat-responsive member, a heater therefor, means mounting the heat-responsive member so as to cause successive movements thereof to bring one end of the member adjacent the heater, to take said end way from the heater, and to bring the other end adjacent the heater, means interconnecting the retainer and the heat-responsive member for causing the retainer to be in retaining position with either of said ends of the heat-responsive member adjacent the heater and the retainer to be in releasing position with neither end of the heat-responsive member adjacent the heater, actuating means for providing the aforesaid movements of the heat-responsive member, a contact element for connecting either the actuating means or the heater with a source of electrical power through said switch, and means engaging the end of the heat-responsive member adjacent the heater to shift the contact element to disconnect the actuating means from and connect the heater with the source of electrical power through said switch upon arrival of said end of the heat-responsive member adjacent the heater and to disconnect the heater from and to reconnect the actuating means with the source of electrical power through said switch upon appropriate heat response of the heat-responsive member.

CYRIL J. FOSTER.

References Cited in the file of this patent

UNITED STATES PATENTS

| Number | Name | Date |
|---|---|---|
| 1,708,522 | Pross | Apr. 9, 1929 |
| 1,739,155 | Lincoln | Dec. 10, 1929 |
| 1,881,884 | Noble | Oct. 11, 1932 |
| 1,892,700 | Harter | Jan. 3, 1933 |
| 1,908,683 | Browning | May 16, 1933 |
| 1,942,835 | Rutenber | Jan. 9, 1934 |
| 1,959,387 | Rubens | May 22, 1934 |
| 1,988,230 | Avery | Jan. 15, 1935 |
| 2,055,707 | Rippl | Sept. 29, 1936 |
| 2,132,622 | Ireland | Oct. 11, 1938 |
| 2,180,233 | Graham | Nov. 14, 1939 |
| 2,215,404 | Myers | Sept. 17, 1940 |
| 2,262,280 | Gomersall | Nov. 11, 1941 |
| 2,288,713 | Ireland | July 7, 1942 |
| 2,332,171 | Sardeson | Oct. 19, 1943 |
| 2,337,124 | Olving | Dec. 21, 1943 |
| 2,402,576 | Purpura | June 25, 1946 |
| 2,439,017 | Meyers | Apr. 6, 1948 |
| 2,465,577 | Cox | Mar. 29, 1949 |
| 2,546,910 | Snyder | Mar. 27, 1951 |
| 2,557,727 | Chandler | June 19, 1951 |